B. H. Melendy,

Door Securers.

No. 105,474.  Patented July 19, 1870.

Witnesses:  
Gustave Dieterich  
Geo. W. Mabee

Inventor:  
B. H. Melendy  
per Munn & Co.  
Attorneys.

United States Patent Office.

BRYANT H. MELENDY, OF MANCHESTER, NEW HAMPSHIRE.

Letters Patent No. 105,474, dated July 19, 1870.

IMPROVEMENT IN COMBINED KEY-RING AND DOOR-FASTENER.

The Schedule referred to in these Letters Patent and making part of the same.

*To all whom it may concern:*

Be it known that I, BRYANT H. MELENDY, of Manchester, in the county of Hillsborough and State of New Hampshire, have invented a new and useful Improvement in Combined Key-Ring and Door-Fastener; and I do hereby declare that the following is a full, clear, and exact description thereof, which will enable others skilled in the art to make and use the same, reference being had to the accompanying drawing forming part of this specification, in which—

Similar letters of reference indicate corresponding parts.

Figure 1:
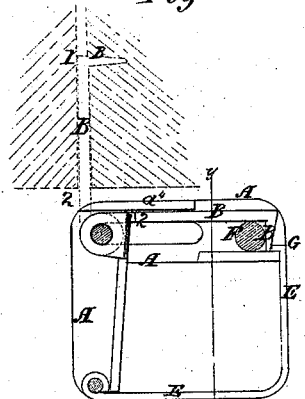
Figure 1 is a detail sectional view of my improved key-ring and door-fastener taken through the line $x$ $x$, fig. 2.
Figure 2:
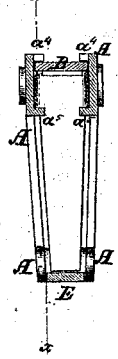
Figure 2 is a detail sectional view of the same, taken through the line $y$ $y$, fig. 1.

My invention has for its object to improve the construction of my improved key-ring and door-fastener, patented May 17, 1870, and numbered 103,068, so as to make it simpler in construction and more convenient and effective in use; and It consists in the construction and combination of various parts of the device, as hereinafter more fully described.

The body of the hook or claw B is made of an even width or thickness from its forward or hook end, 1, back to the point 2, thus making the said hook stronger and less liable to spring when the door is being shut.

The wide part 1 2 of the hook B, when the said hook is closed, passes back beneath the flanges $a^4$ of the parts or pieces A, to prevent the said claw or hook from swinging out when closed.

F is a stay, secured between the parts or pieces A, to hold the said parts more securely in their relative positions, and also to serve as a guide and support for the hook or claw B, when being pushed back beneath the flanges $a^4$ of the parts or pieces A, so that the point of the said claw or hook cannot catch upon the outer edges of the flanges $a^5$ when being pushed back into place.

G is a flanged lip or head formed upon the end of the spring arm E, which bears upon the flanges $a^5$, between which the said arm passes to keep the arm in place, and which also bears against the hook or claw B, to keep the said hook or claw from passing out of its place when closed.

Having thus described my invention,

I claim as new and desire to secure by Letters Patent—

1. The combination of the guide-brace or stay F, with the parts or pieces A and hook or claw B, substantially as herein shown and described, and for the purposes set forth.

2. The combination of the extensions 1 2 of the hook or claw B with the flanges $a^4$ of the parts or pieces A, substantially as herein shown and described, and for the purpose set forth.

3. The flanged lip or head G of the spring arm E, in combination with the flanges $a^5$ of the parts or pieces A, and with the hook B, substantially as herein shown and described, and for the purpose set forth.

BRYANT H. MELENDY.

Witnesses:
JACOB I. WHITTEMORE,
CHARLES N. HEALD.